UNITED STATES PATENT OFFICE.

JACOB JAMESON, OF PHILADELPHIA, PENNSYLVANIA.

IMPROVEMENT IN THE MANUFACTURE OF IRON AND STEEL.

Specification forming part of Letters Patent No. 92,054, dated June 29, 1869; reissue No. 4,622, dated November 7, 1871.

*To all whom it may concern:*

Be it known that I, JACOB JAMESON, of the city and county of Philadelphia and State of Pennsylvania, have invented certain new and useful Improvements in the Manufacture of Iron and Steel, of which the following is a specification:

My invention consists of the addition of a new compound of ingredients as a flux to molten iron in a furnace to produce homogeneous wrought and cast-iron and steel.

In the manufacture of steel from cast-iron, or from a mixture of cast-iron and ore, I have ascertained that the process can be much improved and expedited by the use of a new flux made of the following ingredients, viz: Silex, about forty parts; black oxide of manganese, four parts; nitrate of soda, ten parts; red clay, thirty parts; powdered charcoal, in bulk, equal to one-fourth of the quantity of iron or iron and ore used. The furnace is charged as usual and the above-described composition is added as a flux.

The charging of the furnace and its management having been fully described in the patents heretofore granted to me need not be herein described.

By the use of the flux above described I am able to produce a good quality of steel direct from pig-metal alone, or from pig-metal combined with a proportion of raw ore in a very cheap and expeditious manner.

In the manufacture of wrought or cast-iron the proportion of the flux used must be varied to suit the quality of the iron or ore; the poorer the iron or ore the more of the composition should be added.

To produce a very hard quality of cast-iron, a proportionately-increased quantity of the composition should be used.

I claim as my invention—

The herein-described composition, as a flux, for the manufacture of iron and steel, and likewise the manufacture of iron and steel by the addition to molten iron, while in the furnace, of the herein-described composition in proper proportions.

JACOB JAMESON.

Witnesses:
OWEN JONES,
CHAS. P. CLARKE.

(85)